J. J. HUTSON.

Hog-Ring Blanks.

No. 6,187. Reissued Dec. 22, 1874.

WITNESSES

Henry N. Miller

C. L. Emerk.

INVENTOR

John J. Hutson per Alexander Mason

Attorneys

THE GRAPHIC CO. PHOTO-LITH. 39 & 41 PARK PLACE, N.Y.

UNITED STATES PATENT OFFICE.

JOHN J. HUTSON, OF MADISON COUNTY, OHIO, ASSIGNOR TO WILLIAM B. CHAMBERS AND WILLIAM J. QUINLAN.

IMPROVEMENT IN HOG-RING BLANKS.

Specification forming part of Letters Patent No. 67,765, dated August 13, 1867; reissue No. 6,187, dated December 22, 1874; application filed December 10, 1874.

*To all whom it may concern:*

Be it known that I, JOHN J. HUTSON, of the county of Madison and State of Ohio, have invented certain new and useful Improvements in Hog-Ring; and I do hereby declare that the following is a full, clear, and exact description thereof, reference being had to the accompanying drawings and to the letters of reference marked thereon, which form a part of this specification.

The object of this invention is to furnish a nose-ring to prevent hogs from rooting.

Figure 1:
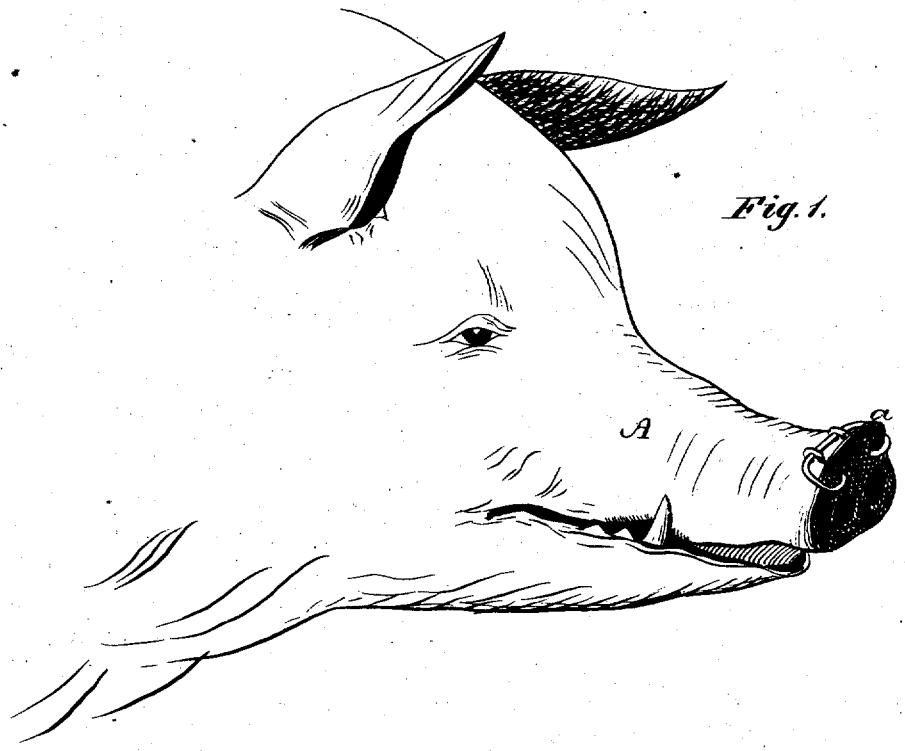
Figure 2:
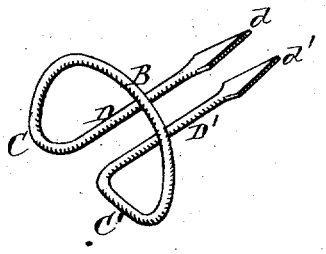
Figure 3:
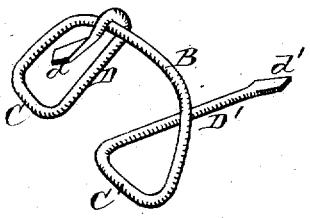

In the accompanying drawings, Figure 1 shows the device in position in the nose of a hog. Fig. 2 shows the device in form for insertion. Fig. 3 shows one of the points bent as in position shown in Fig. 1.

My invention relates to a device to be inserted in the nose of a hog, and consists of a piece of wire so bent as to form two loops or rings, which project from the front of the hog's nose.

It is well known that single loops or rings have for years been used for insertion in the nose of the hog, to prevent the animal from rooting. A single ring or loop of metal has been found more or less defective for the purpose desired, owing to the fact that the the ring or loop, being passed through a single incision in the hog's nose, will bend flat against the front of the nose, and have little or no effect to prevent rooting, and is also liable to break through the flesh, the ring become lost, and the animal's nose greatly injured thereby. My invention is intended to obviate these defects by the employment of a double ring or loop inserted through two incisions in the hog's nose, so that two loops or rings will project in front of the nose.

My invention, therefore, consists of a single piece of wire or ring-blank, so bent as to form, when inserted, two loops or rings which shall project in front of the hog's nose, and with a cross-bar which shall lie over upon the top of the nose and over which the ends of the wire are bent.

In the drawings, A represents the nose of a hog, and *a* the cartilaginous projection thereon. The wire is first bent as shown in Fig. 2, so that the cross-bar B is formed, having in front of the same two loops or rings, C C′. The ends of the wire are sharpened at *d d′*, and these ends, after being so bent, are parallel, or nearly so, and are passed through incisions in the nose, and then bent forward over the cross-bar B, so that the cross-bar B will lie upon the top of the nose, and the rings or loops will project in front of the same, as seen in Fig. 1.

In putting the ring in position, the points *d d′*, Fig. 2, are placed against the lower part of the snout, in such a position that the points, after traversing the cartilage, shall come through at about the angle formed by the cartilage *a* and the part A. A moderate pressure is sufficient to force the points through the snout. The cross-bar B of the ring lies upon the nose, and the parts D D′ pass under and are bent over it into form seen in Fig. 1, and at *d*, Fig. 3, so that, although the points shall not usually come in contact with the snout, yet that the action of rooting shall bring them in contact therewith and cause the hog to desist therefrom.

In the parts of the nose traversed by the wires at D D′ are situated the main tendons used to raise or depress the cartilaginous snout, which makes this the most secure part of the nose to affix a ring to; and as the two bearings of my ring each penetrate this part and are a mutual brace to each other, it follows that my ring must be much more secure than any single ring could be. My ring is when in position, close up to the bottom of the nose, so that nothing can work under between the nose and the ring, causing trouble to the animal, or the tearing of the ring from its place, giving rise to pain to the animal and the trouble and disturbance of affixing another ring in position.

This ring, it will be seen, has no short bends liable to fracture, as is the case in one or more nose-rings before the public.

Having thus fully described my invention, what I claim as new, and desire to secure by Letters Patent, is—

1. A hog-ring blank made of a single piece of wire, forming two rings or loops, to extend in front of the hog's nose, and a cross-bar to lie upon the top of the nose, for the purposes set forth.

2. A hog-ring blank made of a single piece of wire, forming two rings or loops, C C′, and a cross-bar, B, with the two ends *d d′* of the wire sufficiently prolonged to be passed under and clinched forward over the cross-bar, for the purposes set forth.

In testimony that I claim the foregoing I have hereunto set my hand this 17th day of November, 1874.

JOHN J. HUTSON.

Witnesses:
A. L. CARR,
WM. B. CHAMBERS.